Nov. 14, 1939.                L. WEIL                2,179,653
                        CIRCUIT CLOSING DEVICE
                       Original Filed June 6, 1928
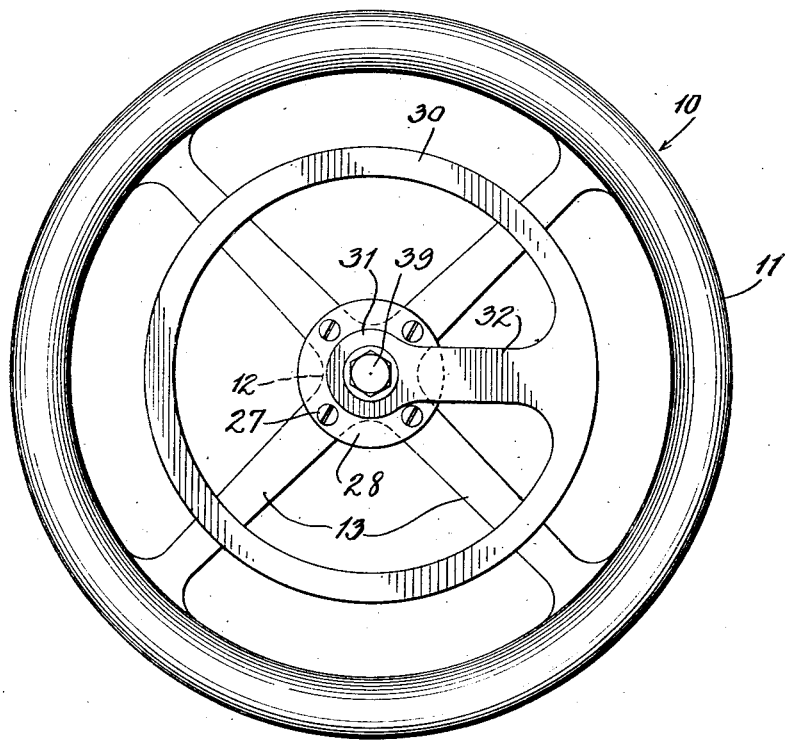
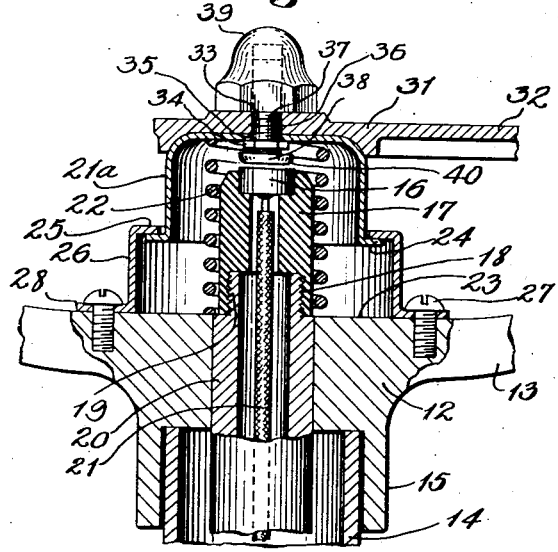
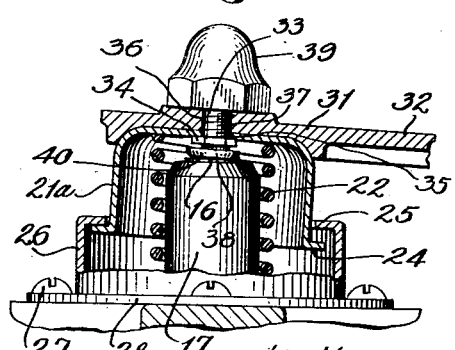
LEO WEIL
INVENTOR.
BY
ATTORNEY Patented Nov. 14, 1939

2,179,653

UNITED STATES PATENT OFFICE 2,179,653

CIRCUIT CLOSING DEVICE

Leo Weil, Brooklyn, N. Y.

Substituted for abandoned application Serial No. 283,151, June 6, 1928. This application August 18, 1937, Serial No. 159,735

4 Claims. (Cl. 200—59)

This invention relates to circuit makers and breakers for operating a horn or other electrically operative signal used in connection with auto-vehicles.

Among the objects of the invention is the provision of exceedingly simple, highly efficient and practical means for closing the signal circuit by the operator of the automobile in any position of the steering wheel without removing his hands from the latter; and to accomplish this by means of a simple unitary device which is inexpensive to make and may be easily applied to the standard circuit maker usually employed in standard makes of cars without necessitating any material or comparatively expensive alterations or additions to such standard construction.

Other objects of this invention will in part be obvious and in part hereinafter pointed out.

This application is a substitute application for applicant's prior abandoned application, Serial No. 283,151, filed June 6, 1928.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiment of this invention, Fig. 1 is a top plan view of an automobile steering wheel with the improved device attached thereto;

Fig. 2 is a fragmentary, axial, cross-sectional view, partly elevational, through the central post of the steering wheel; and Fig. 3 is a view similar to Fig. 2 showing the device in circuit closing position.

Referring in detail to the drawing 10 designates an ordinary automobile steering wheel having a rim portion 11, connected to a metallic central hub portion 12 by radial spokes 13 preferably integral with said portion 12, said wheel being supported by the usual fixed post 14, and said hub portion 12 being provided with a downwardly extending flange portion 15 surrounding the upper portion of said post 14.

The circuit closer construction ordinarily employed in standard automobiles for making and breaking the electric horn circuit comprises a fixed contact 16 supported on an insulating tube 17 having an interiorly threaded portion 18 at the lower end thereof engaging a threaded upper end portion 19 of a tubular member 20 integrally secured to hub 12 as by spot welding, or in any other suitable manner, said tube being connected to the steering gear of the vehicle (not shown). A single conductor 21, extends thru tubes 17 and 20 and connected said fixed contact 16 with one terminal of an ordinary electrically operated horn mechanism (not shown) the other terminal of said horn usually being grounded. The movable contact in the circuit closer for the horn circuit usually comprises a metallic, thimble-shaped, push-button or plunger 21a urged normally out of contact with the contact 16 by a coil compression spring 22 concentric with insulating member 17, the lower end of said spring 22 abutting the upper surface 23 of said hub portion 12. Said push-button is provided with an outwardly extending flange 24 engaging the under side of an inwardly extending flange 25 of a cylindrical retaining member 26 secured to the spokes 13, adjacent the hub portion 12, as by screws 27 passing through suitable openings in a bottom outwardly extending flange 28 on said retaining member 26. To sound the horn, the button 21a which is grounded thru member 26, hub 12 and the steering gear parts, must be pressed to complete the circuit thru the horn mechanism.

For operating the button 21a without removal of the driver's hand from the rim 11, I provide a flat annular member 30, having a diameter slightly less than the rim portion 11 of steering wheel 10, or which may be very easily operatively secured to the push-button 21a. To this end the annular member 30 is provided with a radial arm 32 having an enlarged attaching or socket portion 31. The latter is positioned over the top rounded portion of the button 21a and secured thereto by a bolt 33 inserted from the underside of the button 21a thru a suitable opening 35 therein which registers with a corresponding opening 36 in the socket portion of the arm. The acorn nut 39 is then threaded on the shank 37 of the bolt for securely fastening the member 30 to the push-button. The head 38 of the bolt 33 is preferably rounded as at 40 and constitutes the movable contact for the circuit closer. A locking nut 34 screwed on shank 37 of the bolt 33, may be interposed between the head 38 of said bolt and the underside of push-button 21a to permit adjustment of the movable contact 38.

To sound the alarm, the driver may, without releasing his grip on the steering wheel depress the annular member 30, at any point, with his thumb, thus tilting said member, and consequently the push-button 21a, about a point on the interengaging flanges 24, 25 diametrically opposite to the point of depression on the annular member 30, said point acting as a fulcrum about which the push-button pivots. The head 35 of the bolt 33 forming the movable contact of the circuit closer will then contact the fixed contact 16 to close the circuit and thus sound the horn. Release of thumb pressure on the annular member 30 permits the spring 22 to move the push-button up and thus break the horn circuit. The annular member 30 can be easily made as light casting or by die stamping from light sheet metal in a single operation and as above described can be very easily attached in operative position to the standard steering wheel construction, it being necessary only to bore a hole in the push-button manner of the standard electrical horn circuit.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. In a circuit closing device for an electric horn circuit, the combination with a steering wheel carrying a fixed contact for said circuit and a spring pressed push-button capable of tilting movement relative to said fixed contact, of means for closing said circuit without removing the hand from the rim of the steering wheel, said means comprising a member extending adjacent said rim of said wheel, said member being secured to the top surface of said push-button by a single fastening means, said fastening means having a portion constituting the movable contact for said circuit.

2. In combination with a push-button mounted for tilting movement centrally of the steering wheel of an automobile or the like for sounding the electrically operated horn, means for actuating said push-button without removing the hand from the steering wheel, said means including a member having a portion extending adjacent the rim of the wheel, and means for securing a portion of said member to said push-button, said securing means including a member having a head within the push-button, said head forming a movable contact for the horn circuit.

3. In a circuit closing device of the character described, in combination, a push-button, a fixed contact operatively disposed relative to said push-button, said push-button being capable of tilting movement with respect to said fixed contact, an annular member having an inwardly extending radial arm and means for securing said arm to said push-button, said means including a bolt member serving also as the movable contact for said circuit closer.

4. In a circuit closing device of the character described, in combination, a push-button, a fixed contact operatively disposed relative to said push-button, said push-button being capable of tilting movement relative to said fixed contact, an annular member having an inwardly extending radial arm terminating in a socket for receiving a portion of said push-button and means for securing said arm to said push-button, said means including a bolt member extending thru said push-button and a socket member, said bolt having a portion serving as the movable contact for said circuit closer.

LEO WEIL.